United States Patent
Yao

(10) Patent No.: US 11,039,081 B2
(45) Date of Patent: Jun. 15, 2021

(54) IMAGE SENSOR CAPABLE OF ELIMINATING ROLLING FLICKER AND ADJUSTING FRAME RATE

(71) Applicant: PIXART IMAGING INC., Hsin-Chu County (TW)

(72) Inventor: Wen-Han Yao, Hsinchu County (TW)

(73) Assignee: PIXART IMAGING INC., Hsin-Chu County (TW)

(*) Notice: Subject to any disclaimer, the term of this patent is extended or adjusted under 35 U.S.C. 154(b) by 84 days.

(21) Appl. No.: 16/513,712

(22) Filed: Jul. 17, 2019

(65) Prior Publication Data

US 2021/0021752 A1 Jan. 21, 2021

(51) Int. Cl.
*H04N 5/235* (2006.01)
*H04N 5/353* (2011.01)
*H04N 5/374* (2011.01)

(52) U.S. Cl.
CPC ......... *H04N 5/2357* (2013.01); *H04N 5/2351* (2013.01); *H04N 5/2353* (2013.01); *H04N 5/353* (2013.01); *H04N 5/3742* (2013.01)

(58) Field of Classification Search
CPC .. H04N 5/2357; H04N 5/2353; H04N 5/2351; H04N 5/2355; H04N 5/353; H04N 5/3742; H04N 5/72; G06T 5/007; G06T 1/0007; G06T 7/00
See application file for complete search history.

(56) References Cited

U.S. PATENT DOCUMENTS

| | | | | |
|---|---|---|---|---|
| 10,616,978 | B2* | 4/2020 | Wang | H05B 47/105 |
| 2006/0158531 | A1* | 7/2006 | Yanof | H04N 5/2357 348/226.1 |
| 2012/0194698 | A1* | 8/2012 | Cami | H04N 5/2357 348/226.1 |
| 2013/0287315 | A1* | 10/2013 | Oo | H04N 5/144 382/284 |
| 2015/0195487 | A1* | 7/2015 | Liu | H04N 5/21 348/447 |

* cited by examiner

*Primary Examiner* — Hung H Lam
(74) *Attorney, Agent, or Firm* — Hauptman Ham, LLP

(57) ABSTRACT

There is provided an image sensor for exposing a plurality of pixel rows within a frame period using a rolling shutter. The image sensor includes a processor for calculating bright-dark distribution patterns of image frames. The processor further adjusts the frame period to be substantially identical to a predetermined period by changing a total number of exposed line times within the frame period when a difference between the bright-dark distribution patterns of two image frames is larger than a predetermined threshold.

20 Claims, 5 Drawing Sheets

IMAGE SENSOR CAPABLE OF ELIMINATING ROLLING FLICKER AND ADJUSTING FRAME RATE

BACKGROUND

1. Field of the Disclosure

This disclosure generally relates to an image sensor and, more particularly, to an image sensor capable of compensating the clock shifting caused by environmental change and eliminating the rolling flicker in image frames.

2. Description of the Related Art

The optical motion sensor identifies the variation of object positions with time by detecting reflected light at different times from an object. In the motion sensor using the rolling shutter, as every pixel row starts to expose at different times, the flicker can appear in image frames acquired by an image sensor when ambient light has an intensity variation of a specific frequency (e.g., under a fluorescent lamp). Especially when a frame rate of the image sensor does not match the intensity variation frequency, so called moving flickers or rolling flickers appear in the image frames to degrade the accuracy of motion detection.

This mismatch can be caused by environmental change, e.g., the clock frequency of the motion sensor being shifted due to the temperature variation. This clock frequency change leads to an actual frame rate of the image sensor during operation not identical to the expected frame rate.

Accordingly, the present disclosure provides an image sensor that can eliminate rolling flickers in the image frames even using an incorrect clock frequency.

SUMMARY

The present disclosure provides an image sensor that fine tunes the frame rate to match an oscillation frequency of ambient light to eliminate the rolling flicker even using an incorrect clock frequency. In this way, the detection accuracy is improvable even without correcting the clock frequency or using an accurate crystal oscillator.

The present disclosure further provides an image sensor that causes the frame rate to match a predetermined frequency by adjusting a blank time interval between two adjacent image frames. In this way, even though the clock frequency drifts with the environmental change, the image frames are outputted with a correct frame rate.

The present disclosure provides an image sensor acquiring image frames with a frame period and including a pixel array and a processor. The pixel array is configured to output a first image frame and a second image frame, wherein the pixel array is exposed using a rolling shutter. The processor is configured to calculate a first bright-dark distribution pattern of the first image frame, calculate a second bright-dark distribution pattern of the second image frame, and compare the first bright-dark distribution pattern and the second bright-dark distribution pattern to confirm existence of rolling flickers.

The present disclosure further provides an image sensor acquiring image frames with a frame period and including a pixel array and a processor. The pixel array is configured to output a first image frame and a second image frame, wherein the pixel array is exposed using a rolling shutter, and the frame period comprises line times of multiple valid pixel rows and line times of multiple dummy pixel rows. The processor is configured to calculate a first bright-dark distribution pattern of the first image frame, calculate a second bright-dark distribution pattern of the second image frame, and adjust a blank time according to a difference between the first bright-dark distribution pattern and the second bright-dark distribution pattern.

The present disclosure further provides an image sensor acquiring image frames with a frame period and including a pixel array, a clock generator and a processor. The pixel array is configured to output successive image frames using a rolling shutter, wherein the frame period of the image frames comprises line times of multiple valid pixel rows and line times of multiple dummy pixel rows. The clock generator is configured to use a clock frequency to count each of the line times of multiple valid pixel rows and the line times of multiple dummy pixel rows. The processor is configured to adjust a blank time to compensate a deviation of the frame period caused by a clock frequency shift when the clock frequency of the clock generator is changed by a temperature variation.

In the present disclosure, the dummy pixel rows are referred to pixel rows that do not physically exist and are controlled by dummy row address. A next frame period is entered after the line time of the dummy pixel rows is ended. The line time of the dummy pixel rows is used to create a waiting time interval or a blank time interval after physical pixel rows are all exposed so as to extend the frame period of an image frame to an expected period.

The present disclosure performs the motion detection according to the image frames with a frame period thereof being adjusted so as to eliminate the interference caused by the rolling flicker. Furthermore, as the clock frequency is not adjusted, the exposure interval is not changed to stabilize average brightness of the image frames.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

One objective of the present disclosure is to provide an image sensor that eliminates rolling flickers or moving flickers in successive image frames under a time-varying ambient light. The rolling flickers can be seen through a display screen on which the successive image frames are shown. For example, when using a camera of a smartphone to photograph a space with the time-varying ambient light, the rolling flickers can be seen on the screen of smartphone.

The image sensor of the present disclosure further utilizes an oscillation frequency of the ambient light to fine tune a frame rate thereof to compensate the clock frequency shift caused by environmental change.

Figure 1:
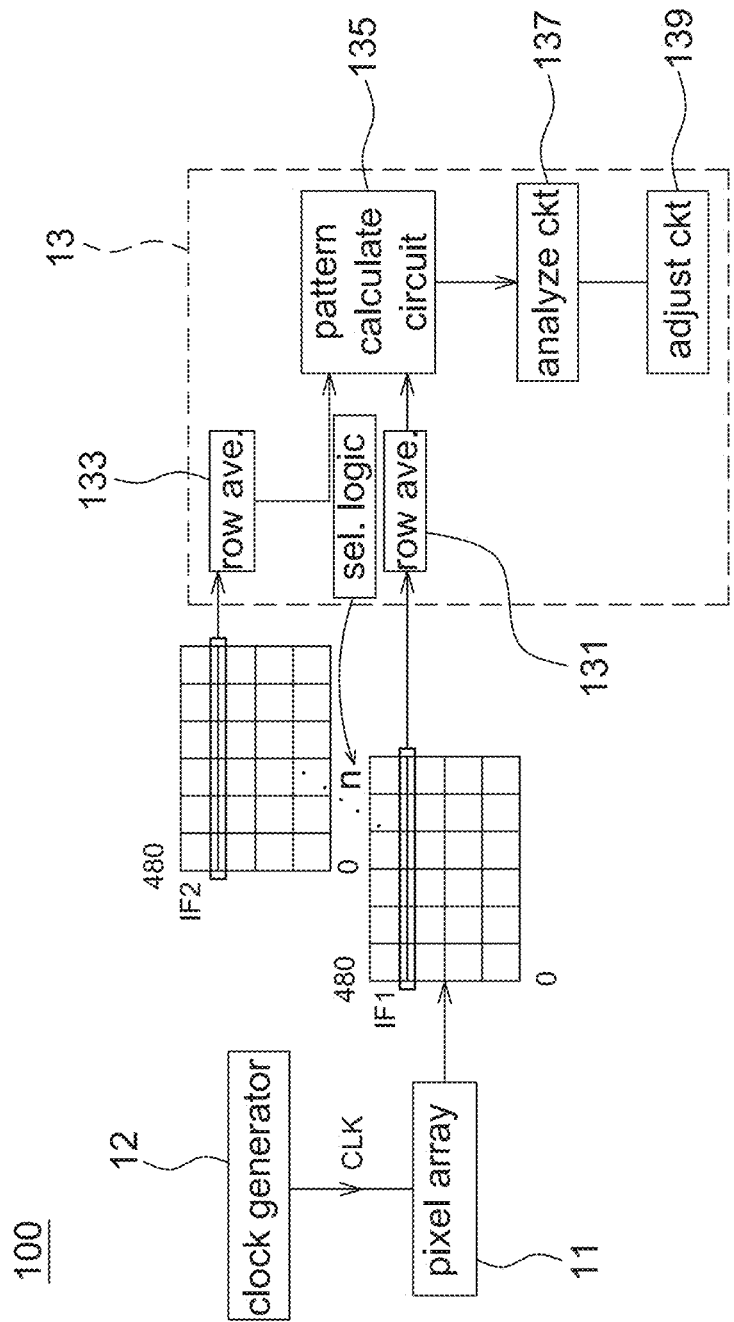
FIG. 1 is a schematic block diagram of an image sensor according to one embodiment of the present disclosure.

Referring to FIG. 1, it is a schematic block diagram of an image sensor 100 according to one embodiment of the present disclosure, which includes a pixel array 11 and a processor 13. The image sensor 100 is a CMOS image sensor or a CCD image sensor without particular limitations. The processor is a digital signal processor (DSP) or an application specific integrated circuit (ASIC), which processes image frames outputted by the pixel array 11 using software and/or hardware.

The image sensor 100 of the present disclosure acquires the image frames using a frame period. e.g., FIG. 1 showing a first image frame IF1 and a second image frame IF2 captured at different times. According to different applications, the first image frame IF1 and the second image frame IF2 are two adjacent image frames or two image frames separated by at least one another image frame.

Figure 3:
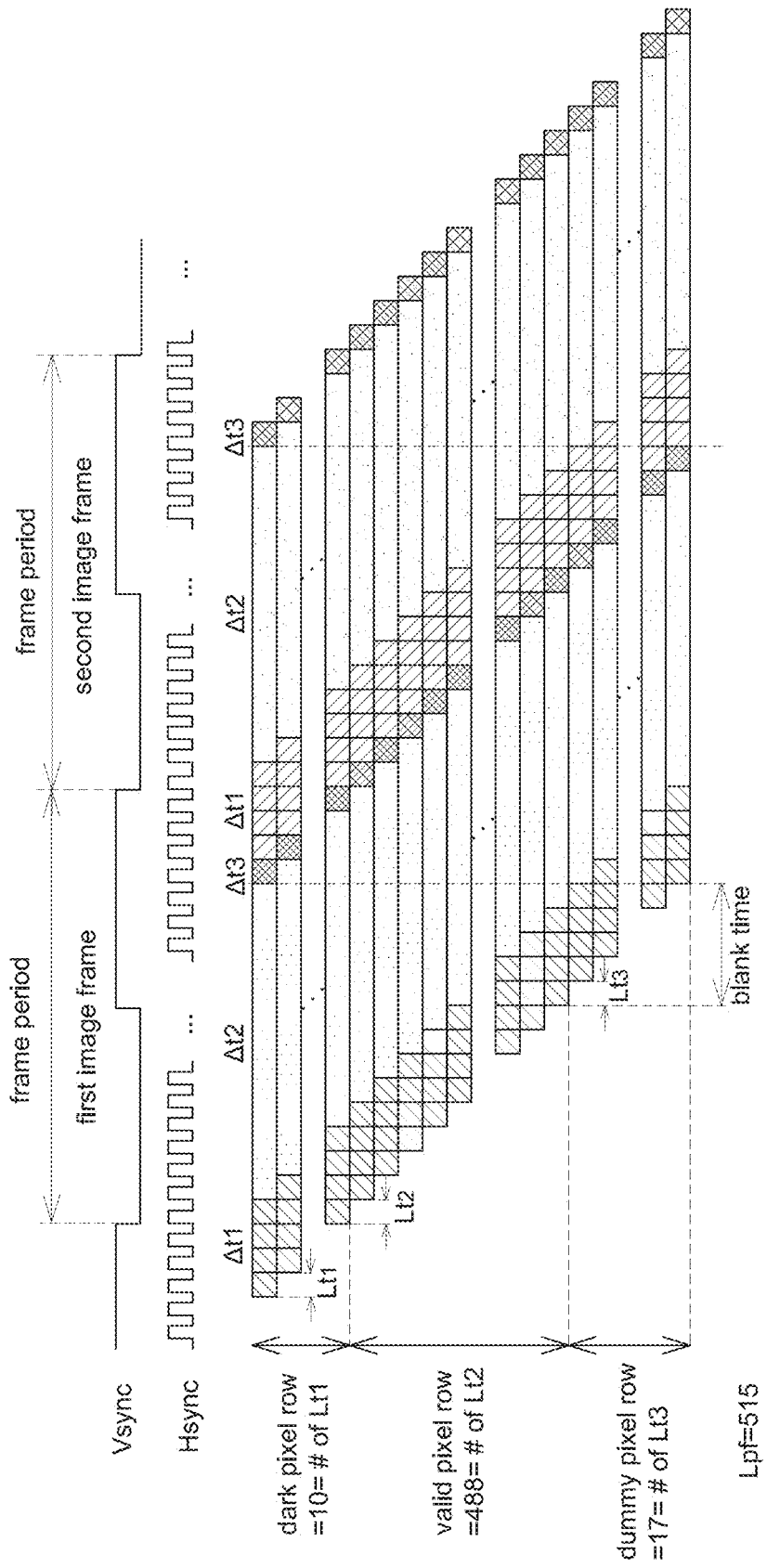
FIG. 3 is an operational schematic diagram of an image sensor according to one embodiment of the present disclosure.

Referring to FIG. 3, it is an operational schematic diagram of an image sensor 100 according to one embodiment of the present disclosure. The pixel array 11 is exposed using a rolling shutter. One frame period is formed by line times of multiple dark pixel rows Lt1, lines times of multiple valid pixel rows Lt2 and line times of multiple dummy pixel rows Lt3, wherein the line times Lt1. Lt2 and Lt3 are identical to each other, and each of the line times Lt1, Lt2 and Lt3 is referred to a time difference between the operation beginning of two adjacent pixel rows to form the rolling shutter. In the present disclosure, the line times Lt1, Lt2 and Lt3 are illustrated by a number of clock periods of a clock signal.

The line times Lt1 cover a time interval for the pre-processing before pixel data of an image frame starts to be acquired. The line times Lt2 cover a time interval for actually acquiring pixel data. The pixel array 1 includes physical pixel rows respectively corresponding the operation of the line times Lt1 and the line times Lt2. The difference between the two pixel rows is that pixels corresponding to the line times Lt1 are not illuminated by external light (e.g., covered by an opaque layer) and thus only dark pixel data is outputted.

The line times Lt3 are arranged to adjust the frame period to match a predetermined frequency, e.g., 60 Hz, 50 Hz or multiples thereof. The pixel array 11 does not include physical pixel rows corresponding to the operation of the line times Lt3. That is, within the line times Lt3, the pixel array 11 does not generate any pixel data. The line times Lt3 are controlled by a dummy row address by, for example, a row decoder for waiting an end of a current image frame and entering a next image frame. Accordingly, the line times L3 form a blank time interval between two successive image frames.

As shown in FIG. 3, the operation of every pixel row includes an unexposed interval $\Delta t1$ (filled with inclined lines), an exposed interval $\Delta t2$ (filled with dots) and a read interval $\Delta t3$ (filled with meshes), wherein if the frame period is not adjusted, $\Delta t1+\Delta t2+\Delta t3$ is fixed corresponding to successive image frames. The exposed interval $\Delta t2$ is determined according to the auto exposure, and a length of the exposed interval $\Delta t2$ is changed in conjunction with shortening or extending the unexposed interval $\Delta tL1$ to keep $\Delta t1+\Delta t2+\Delta t3$ unchanged. In the case that average ambient light does not change, the exposed interval $\Delta t2$ is not changed. Accordingly, if it is desired to change the whole frame period by increasing or decreasing a number of line times of dummy pixel rows Lt3, this objective is implemented by increasing or decreasing the unexposed interval $\Delta t1$, illustrated by an example below.

The image sensor 100 further includes a clock generator 12 used to generate a clock signal CLK, used as a local clock, to count each of the line times of dark pixel rows Lt1, line times of valid pixel rows Lt2 and line times of dummy pixel rows Lt3. For example, it is assumed that the clock signal CLK is set as 12 MHz as well as Lt1, Lt2 and Lt3 are set as 776 clock periods. In order to generate a VGA image, a number of line times of valid pixel rows Lt2 is arranged as 488 (including additional 8 pixel rows for the image signal processing), and it is also assumed that a number of line times of dark pixel rows Lt1 is 10. In this case, when a variation frequency of ambient light is 60 Hz and if a number of line times of dummy pixel rows Lt3 is arranged as 17, the line per frame (Lpf) is equal to 515 (=10+488+17) such that the frame period is equal to 1/30 second to match the ambient light variation, i.e. (776/12M)×515=1/30.

When the frame period does not match the ambient light variation, rolling flickers appear in successive image frames acquired by the image sensor 100. To not change average brightness of the image frames, the present disclosure adjusts a blank time interval between two successive image frames by the processor 13 without adjusting a clock frequency of the clock signal CLK. Accordingly, even though the clock signal CLK generated by the clock generator 12 changes with the temperature variation, the frame rate is adjusted to match a predetermined frequency without changing the clock frequency.

In one aspect, the blank time interval is determined by a number of line times of dummy pixel rows Lt3 by counting a number of pulses of a horizontal synchronization signal (Hsync shown in FIGS. 3-5) using a row counter. In another aspect, the blank time interval is determined by a number of times of counting the blank time interval by the clock signal CLK generated by the clock generator 12. In this case, since a number of L3 is not used to determine the blank time interval, it is possible to adjust the blank time interval using a scale smaller than Lt3 (smallest adjustment is a period of the clock signal). In an alternative aspect, the blank time interval is determined by a period of every pulse of the horizontal synchronization signal Hsync. If the period of every pulse of Hsync is longer, the blank time interval is longer.

It is noted that when rolling flickers exist, bright-dark distribution patterns between different image frames are different from each other. Accordingly, in one non-limiting aspect, the processor 13 is used to calculate a first bright-dark distribution pattern of the first image frame IF1 and calculate a second bright-dark distribution pattern of the second image frame IF2. For example, the processor 13 takes the bright-dark variation of at least one pixel column of the first image frame IF1 as the first bright-dark distribution pattern, and takes the bright-dark variation of the corresponding column of the second image frame IF2 as the second bright-dark distribution pattern. If the rolling flickers exist, the first bright-dark distribution pattern is different from the second bright-dark distribution pattern since they are bright-dark variations at different times.

Figure 2A:
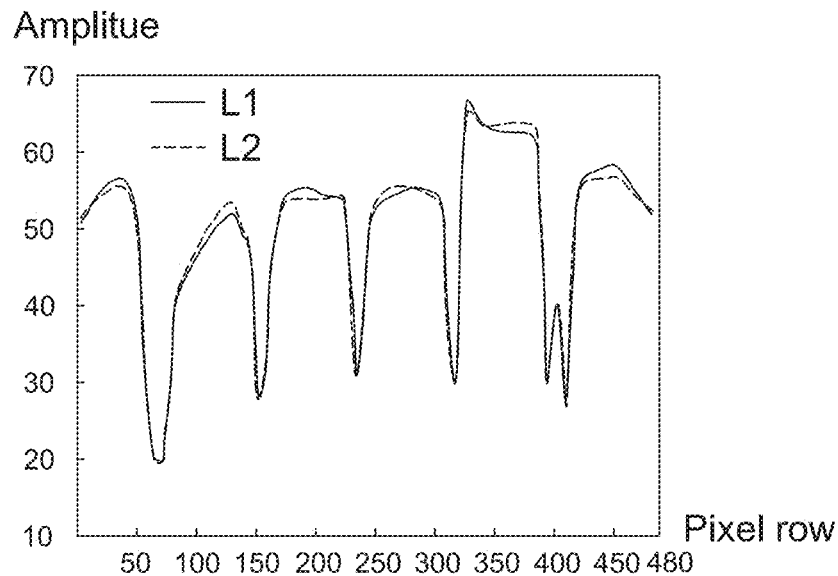
FIG. 2A is a schematic diagram of bright-dark distribution patterns of two image frames acquired by an image sensor according to one embodiment of the present disclosure.

In another non-limiting aspect, the processor 13 calculates a summation or an average of gray values of every pixel row of the first image frame IF1 as the first bright-dark distribution pattern (e.g., L1 shown in FIG. 2A), and calculates a summation or an average of gray values of every pixel row of the second image frame IF2 as the second bright-dark distribution pattern (e.g., L2 shown in FIG. 2A). L1 and L2 in FIG. 2A are shown to be different for illustration purposes.

The processor 13 compares the first bright-dark distribution pattern L1 with the second bright-dark distribution pattern L2 to confirm whether rolling flickers exist or not. For example, the processor 13 calculates the similarity or correlation between the first bright-dark distribution pattern L1 and the second bright-dark distribution pattern L2 to perform the comparing process. Referring to FIG. 2A again, if there is no rolling flicker, L and L2 are substantially identical to have a high similarity and correlation. When the similarity or correlation is lower, it means that the rolling flicker is more serious.

In another aspect, the processor 13 does not compare the whole first bright-dark distribution pattern L1 with the whole second bright-dark distribution pattern L2. For example, the processor 13 respectively selects at least one (not all) brightest or darkest row(s), but not limited to, in the first bright-dark distribution pattern L1 and the second bright-dark distribution pattern L2. Then, the processor 13 compares a position of the selected brightest or darkest row(s) in the first and second bright-dark distribution patterns L1 and L2 to determine whether a position difference between the selected brightest or darkest row(s) is larger than a difference threshold. When the position difference is larger, it means that the rolling flicker is more serious. When the position difference is smaller than a difference threshold, L1 and L2 are considered to be identical.

In the embodiment shown in FIG. 1, the processor 13 includes row averaging circuits (shown as row ave.) 131 and 133, a pattern calculate circuit 135, an analyze circuit (shown as analyze ckt) 137 and an adjust circuit (shown as adjust ckt) 139. The row averaging circuits 131 and 133 are used to respectively calculate the summation or average of gray values of every pixel row of the first image frame IF and the second image frame IF2. The pattern calculate circuit 135 is used to calculate a first bright-dark distribution pattern (e.g., L1) of the first image frame IF1 and a second bright-dark distribution pattern (e.g., L2) of the second image frame IF2. The analyze circuit 137 is used to compare the first bright-dark distribution pattern L1 and the second bright-dark distribution pattern L2 to confirm whether there are rolling flickers. The adjust circuit 139 is used to adjust the frame rate to match a predetermined frequency when the existence of rolling flickers is identified.

It should be mentioned that although FIG. 1 shows two row averaging circuits 131 and 133, it is only intended to illustrate but not to limit the present disclosure. In other aspect, the processor 13 includes only one row averaging circuit to calculate the summation or average of gray values of every pixel row of both the first image frame IF1 and the second image frame IF2.

It is appreciated that although FIG. 1 shows different functions of the processor 13 by different blocks, it is only intended to illustrate by not limit the present disclosure. The operation of every functional block is considered to be executed by the processor 13.

Figure 2B:
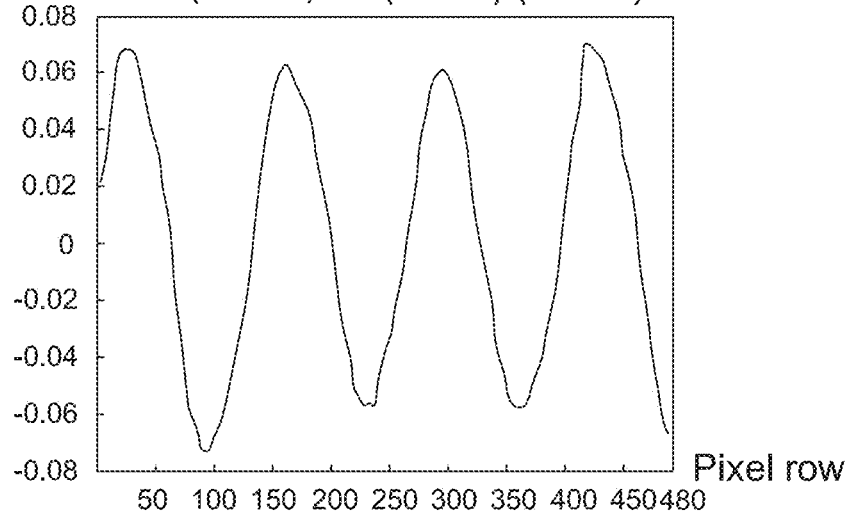
FIG. 2B is a schematic diagram of a normalized difference distribution between two image frames acquired by an image sensor according to one embodiment of the present disclosure.

In another non-limiting aspect, the processor 13 is used to calculate a normalized difference distribution (P1-P2) between the first bright-dark distribution pattern L1 and the second bright-dark distribution pattern L2 to perform the comparing process. The normalized difference distribution (P1-P2) is calculated, for example, by a formula 2(L1-L2)/(L1+L2) shown in FIG. 2B, wherein (L1+L2) is for normalizing the difference 2(L-L2). In the present disclosure, when the normalized difference distribution (P1-P2) fluctuates between positive and negative values, and has a fluctuation amplitude larger than an amplitude threshold, the processor 11 identifies the existence of rolling flickers. In addition, if there is interference within the field of view (FOV) of the image sensor 100, the processor 13 identifies the existence of rolling flickers further when a fluctuation time of the normalized difference distribution (P1-P2) is smaller than a predetermined number of times (e.g., FIG. 2B shown about 3.725 times, which is determined according to different system parameters and ambient light frequencies).

In other aspects, the processor 13 further compares two normalized difference distributions of two pairs of image frames. When the two normalized difference distributions have a difference therebetween, it means that the rolling flickers exist.

More specifically, in the present disclosure, the objective of adjusting a frame rate is achieved by adjusting, as one way, a number of line times of dummy pixel rows Lt3 according to a difference between a first bright-dark distribution pattern and a second bright-dark distribution pattern of two image frames captured at different times. In the case that the similarity or the correlation is used to confirm the rolling flickers, the processor 13 further calculates similarities and correlations between the first and second bright-dark distribution patterns of two image frames when said two image frames are separated by image frames of different separated numbers n (e.g., FIG. 1 showing n being selected by a sel. logic) to obtain a separated number n corresponding to a smallest similarity or a smallest correlation, i.e. for enlarging the difference. The purpose of selecting a best separated number n is to cause the feature of FIGS. 2A and 2B to be more apparent for making the identification easier. In the present disclosure, the separated number n is selected as 1, 2 or 3, but not limited to.

As mentioned above, when the clock frequency of the clock generator 12 changes with the temperature variation, even though Lpf=515 and every line time (including Lt1, Lt2 and Lt3) is set as 776 clock periods under 12 MHz clock frequency, the operating frame period is not equal to $\frac{1}{30}$ second since the clock frequency is not accurate. Accordingly, the present disclosure utilizes the processor 13 to adjust a blank time interval to compensate the incorrectness of frame period due to the clock frequency drift. In the present disclosure, the processor adjusts the blank time interval by adjusting at least one of a number of line times of dummy pixel rows Lt3 (i.e., changing a number of dummy pixel rows), adjusting a number of times of counting the blank time by the clock signal and adjusting a period of a horizontal synchronization signal Hsync within the blank time.

In the case of adjusting the blank time interval by adjusting a period of a horizontal synchronization signal Hsync, the period of pulses not within the blank time is also adjusted or not adjusted. More specifically, different means is used to change the frame rate to match a variation frequency of ambient light without limited to only changing the blank time interval.

In this way, the image sensor 100 of the present disclosure can maintain a correct frame rate by adjusting the blank time interval (e.g., a total number of Lpt) even though the clock period is changed by temperature variation.

As mentioned above, the processor 13 identifies whether the clock frequency is changed according to bright-dark distribution patterns of different image frames, e.g., calculating the similarity or correlation between the bright-dark distribution patterns L1 and L2 of different image frames as shown in FIG. 2A, or calculating a normalized different distribution (P1−P2) of the bright-dark distribution patterns L1 and L2 between different image frames as shown in FIG. 2B. Meanwhile, to increase the identification accuracy, the processor 13 further changes a number of image frames between said different image frames during confirming whether the clock frequency is changed to select the value of an appropriate separated number n (referring to FIG. 1).

Figure 4:
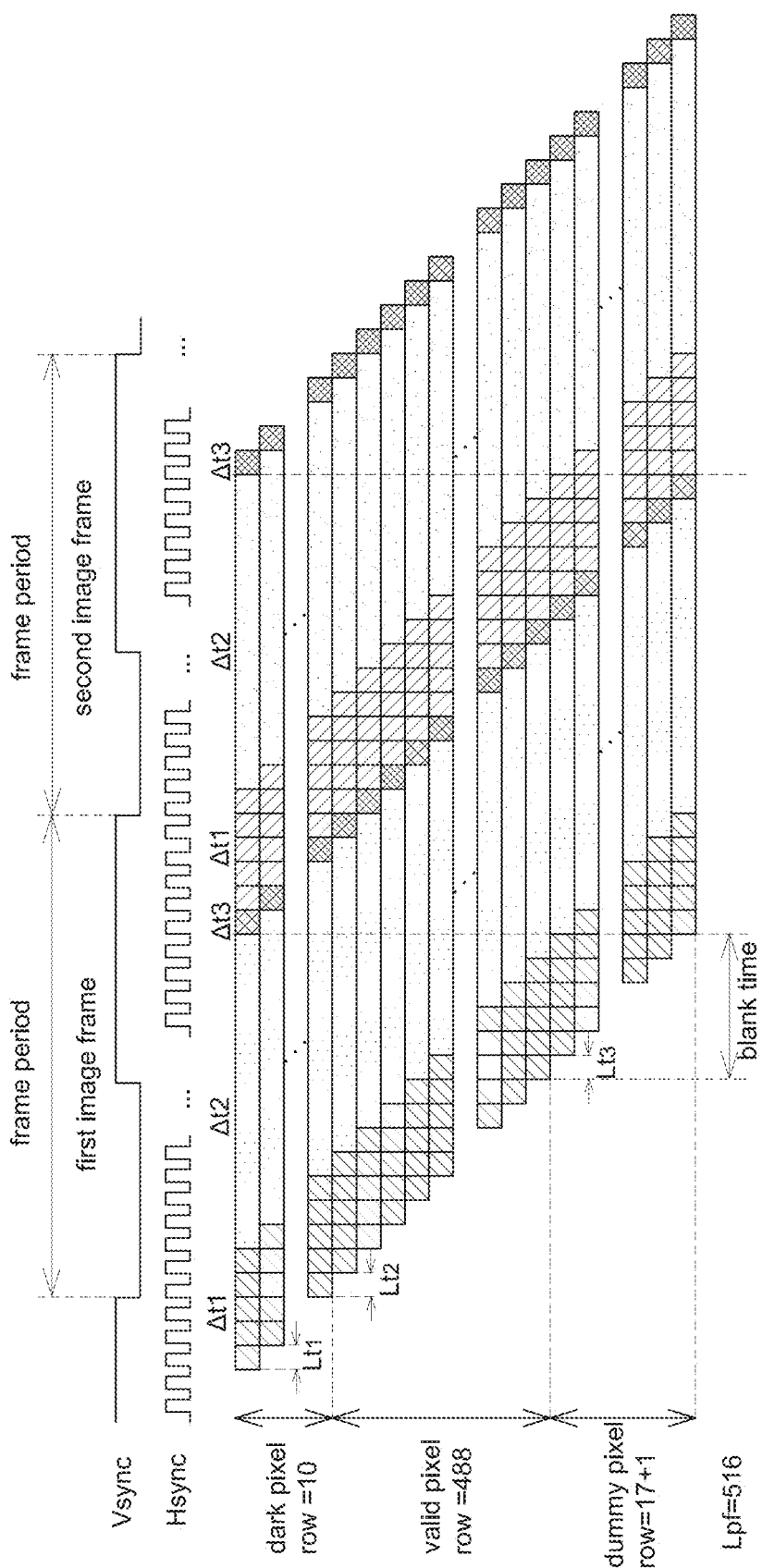
FIG. 4 is an operational schematic diagram of an image sensor according to another embodiment of the present disclosure in which a total number of lines per frame is increased by 1.

Referring to FIG. 4, when the clock frequency is shifted to increase (or clock period decreased) due to the environmental variation, a total time interval for oscillating identical number of times (e.g. 776) is shortened. Accordingly, the present disclosure increases a number of line times of dummy pixel rows Lt3, e.g., FIG. 4 showing one line time being increased to cause Lpf=516, to compensate the deviation of frame period caused by the clock frequency drift.

Figure 5:
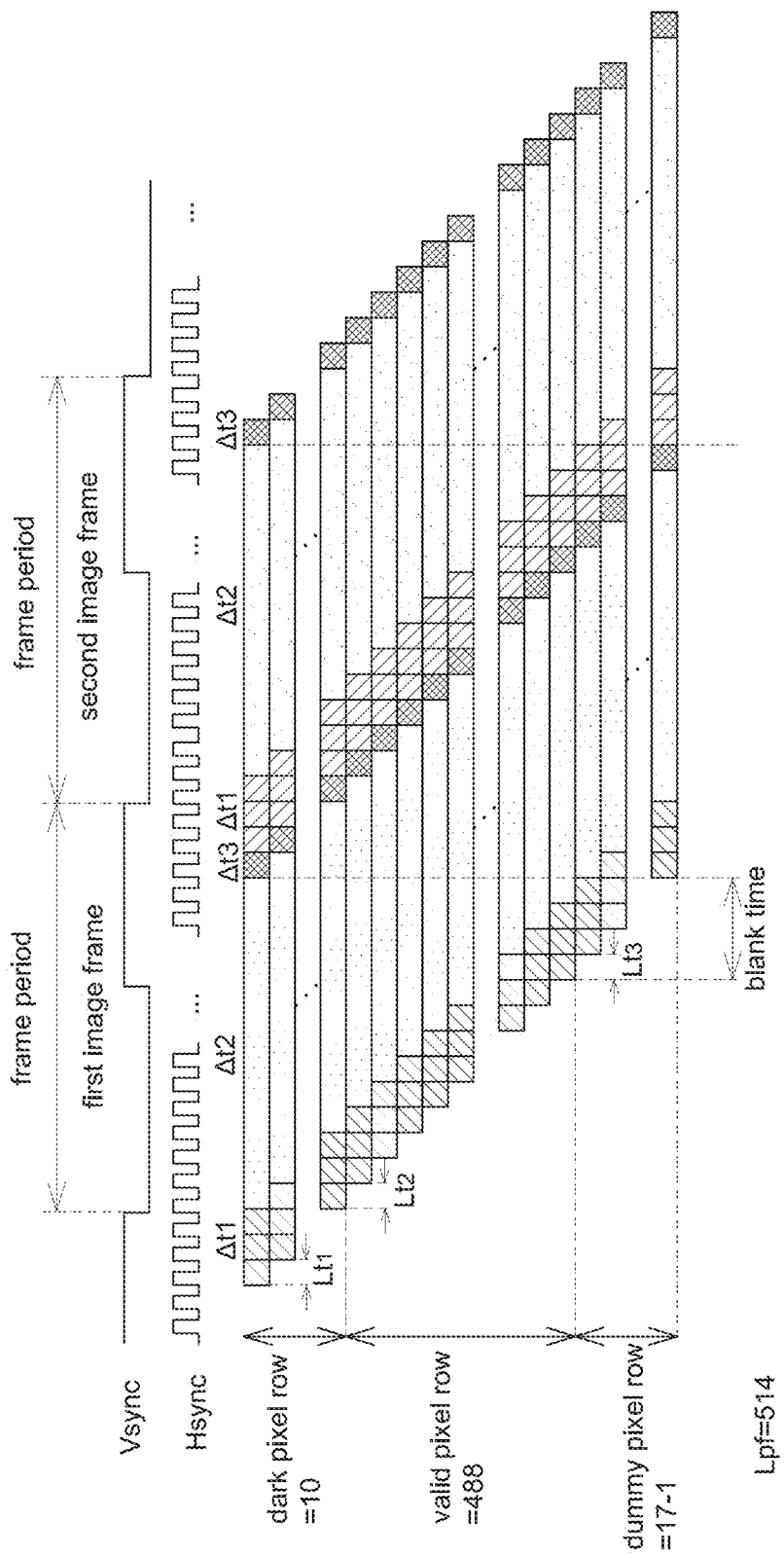
FIG. 5 is an operational schematic diagram of an image sensor according to an alternative embodiment of the present disclosure in which a total number of lines per frame is decreased by 1.

Referring to FIG. 5, when the clock frequency is shifted to decrease (or clock period increased) due to the environmental variation, a total time interval for oscillating identical number of times (e.g. 776) is extended. Accordingly, the present disclosure decreases a number of line times of dummy pixel rows Lt3, e.g., FIG. 5 showing one line time being decreased to cause Lpf=514, to compensate the deviation of frame period caused by the clock frequency drift.

The adjusting process of the present disclosure is arranged as continuously increasing a number of line times of dummy pixel rows Lt3 till a predetermined upper limit (e.g., Lpf=530) is reached when a difference between the first and second bright-dark distribution patterns exceed a predetermined value. If said difference is not decreased to be within the predetermined value by increasing the number of line times of dummy pixel rows Lt3, the number of line times of dummy pixel rows Lt3 is then decreased till a predetermined lower limit (e.g., Lpf=500) is reached to accordingly find a better number of 3. The adjusting sequence is exchangeable. In addition, when a direction of the frequency drifting caused by the temperature variation is known, it is possible to select whether to increase or decrease Lpf at first to reduce the adjusting interval. The line time adjustment of the present is performed corresponding to a single or fixed ambient light variation frequency.

It is appreciated that values in the above descriptions such as the clock frequency, line time and a number thereof, and pixel array size are only intended to illustrate but not to limit the present disclosure.

As mentioned above, it is known that in a time-varying environment rolling flickers can appear in successive image frames when a frame rate of the image sensor does not match a variation frequency of ambient light to degrade the detection accuracy. One reason to cause the mismatch is the drifting of a clock period of the image sensor to be different from the expected clock period. Accordingly, the present disclosure further provides an image sensor (e.g. FIG. 1) that changes a frame rate of the image sensor without correcting a clock frequency thereof. The reason of not correcting the clock frequency is that average brightness of image frames is also changed when the clock frequency is adjusted. When the frame rate is adjusted to match a variation frequency of ambient light, even though the image frames captured by the image sensor may still contain fixed flickers, those fixed flickers do not affect the flowing judgement, e.g., gesture or motion identification.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An image sensor, configured to acquire image frames with a frame period, the image sensor comprising:
   a pixel array configured to output a first image frame and a second image frame, wherein the pixel array is exposed using a rolling shutter; and
   a processor configured to
   calculate a first bright-dark distribution pattern of the first image frame,
   calculate a second bright-dark distribution pattern of the second image frame,
   calculate a normalized difference distribution between the first bright-dark distribution pattern and the second bright-dark distribution pattern, and
   confirm existence of rolling flickers when the normalized difference distribution fluctuates between positive and negative values and has a fluctuation amplitude larger than an amplitude threshold.

2. The image sensor as claimed in claim 1, wherein the first image frame and the second image frame are two adjacent image frames or two image frames separated by at least one another image frame.

3. The image sensor as claimed in claim 1, wherein
   the first bright-dark distribution pattern is a distribution of a summation or an average of gray values of every pixel row of the first image frame, and
   the second bright-dark distribution pattern is a distribution of a summation or an average of gray values of every pixel row of the second image frame.

4. The image sensor as claimed in claim 1, wherein the processor is further configured to confirm the existence of the rolling flickers when the normalized difference distribution and has a fluctuation time smaller than a predetermined number of times.

5. The image sensor as claimed in claim 1, wherein the processor is configured to calculate a similarity or a correlation between the first bright-dark distribution pattern and the second bright-dark distribution pattern to calculate the normalized difference distribution.

6. The image sensor as claimed in claim 1, wherein
   the frame period comprises line times of multiple valid pixel rows, line times of multiple dummy pixel rows and line times of multiple dark pixel rows, and
   the processor is further configured to adjust a number of the line times of multiple dummy pixel rows when a difference between the first bright-dark distribution pattern and the second bright-dark distribution pattern is larger than a difference threshold.

7. An image sensor, configured to acquire image frames with a frame period, the image sensor comprising:
   a pixel array configured to output a first image frame and a second image frame, wherein the pixel array is exposed using a rolling shutter, and the frame period comprises line times of multiple valid pixel rows and line times of multiple dummy pixel rows; and
   a processor configured to
   calculate a first bright-dark distribution pattern of the first image frame,
   calculate a second bright-dark distribution pattern of the second image frame, and adjust a blank time according to a difference between the first bright-dark distribution pattern and the second bright-dark distribution pattern.

8. The image sensor as claimed in claim 7, wherein the first image frame and the second image frame are two adjacent image frames or two image frames separated by at least one another image frame.

9. The image sensor as claimed in claim 7, wherein
the first bright-dark distribution pattern is a distribution of a summation or an average of gray values of every pixel row of the first image frame, and
the second bright-dark distribution pattern is a distribution of a summation or an average of gray values of every pixel row of the second image frame.

10. The image sensor as claimed in claim 7, wherein the processor is configured to calculate a similarity or a correlation between the first bright-dark distribution pattern and the second bright-dark distribution pattern to adjust the blank time.

11. The image sensor as claimed in claim 10, wherein the processor is further configured to calculate similarities and correlations between the first bright-dark distribution pattern and the second bright-dark distribution pattern when the first and second image frames are separated by different numbers of image frames to obtain a separated number corresponding to a smallest similarity or a smallest correlation.

12. The image sensor as claimed in claim 7, further comprising a clock generator configured to generate a clock signal to count each of the line times of multiple valid pixel rows and the line times of multiple dummy pixel rows, wherein the processor is configured to not adjust a clock frequency of the clock signal while adjusting the blank time.

13. The image sensor as claimed in claim 12, wherein the processor is configured to adjust the blank time by adjusting at least one of
a number of the line times of multiple dummy pixel rows,
a number of times of counting the blank time by the clock signal, and
a period of a horizontal synchronization signal within the blank time.

14. An image sensor, configured to acquire image frames with a frame period, the image sensor comprising:
a pixel array configured to output successive image frames using a rolling shutter, wherein the frame period of the image frames comprises line times of multiple valid pixel rows and line times of multiple dummy pixel rows;
a clock generator configured to use a clock frequency to count each of the line times of multiple valid pixel rows and the line times of multiple dummy pixel rows; and
a processor configured to adjust a blank time to compensate a deviation of the frame period caused by a clock frequency shift when the clock frequency of the clock generator is changed by a temperature variation.

15. The image sensor as claimed in claim 14, wherein the processor is configured to identify whether the clock frequency is changed according to bright-dark distribution patterns of different image frames.

16. The image sensor as claimed in claim 15, wherein the processor is configured to calculate a similarity or a correlation of the bright-dark distribution patterns of the different image frames to identify whether the clock frequency is changed.

17. The image sensor as claimed in claim 15, wherein the processor is configured to calculate a normalized difference distribution between the bright-dark distribution patterns of the different image frames to identify whether the clock frequency is changed.

18. The image sensor as claimed in claim 15, wherein the processor is further configured to change a separated number of image frames between the different image frames while identifying whether the clock frequency is changed.

19. The image sensor as claimed in claim 14, wherein
when the clock frequency is increased, the processor is configured to increase the blank time; and
when the clock frequency is decreased, the processor is configured to decrease the blank time.

20. An image sensor, configured to acquire image frames with a frame period, the image sensor comprising:
a pixel array configured to output a first image frame and a second image frame, wherein the pixel array is exposed using a rolling shutter; and
a processor configured to
calculate a first bright-dark distribution pattern of the first image frame,
calculate a second bright-dark distribution pattern of the second image frame, and
compare the first bright-dark distribution pattern and the second bright-dark distribution pattern to confirm existence of rolling flickers, wherein
the frame period comprises line times of multiple valid pixel rows, line times of multiple dummy pixel rows and line times of multiple dark pixel rows, and
the processor is further configured to adjust a number of the line times of multiple dummy pixel rows when a difference between the first bright-dark distribution pattern and the second bright-dark distribution pattern is larger than a difference threshold.

* * * * *